United States Patent [19]

Moulin et al.

[11] 3,984,208

[45] Oct. 5, 1976

[54] ANODES FOR SOLID ELECTROLYTE CAPACITORS

[75] Inventors: Jean-Claude Moulin; Balint Escher; Dominique Prince, all of Paris, France

[73] Assignee: Societe Lignes Telegraphiques et Telephoniques, Paris, France

[22] Filed: Feb. 13, 1974

[21] Appl. No.: 442,228

[30] Foreign Application Priority Data

Feb. 19, 1973  France .............................. 73.05717

[52] U.S. Cl. .................................. 29/182; 75/174; 75/222; 317/258
[51] Int. Cl.² ...................... C22C 1/04; C22C 1/05; C22C 28/00; H01G 1/01
[58] Field of Search ..................... 75/222, 200, 174; 29/182; 252/512, 515; 317/258

[56] References Cited
UNITED STATES PATENTS

| | | | |
|---|---|---|---|
| 3,093,883 | 5/1962 | Haring | 317/230 X |
| 3,232,752 | 2/1966 | Klopping | 75/200 |
| 3,285,716 | 8/1966 | Contant | 75/174 X |
| 3,320,500 | 5/1967 | Axelrod et al. | 252/513 X |
| 3,403,303 | 9/1968 | Klein | 75/222 X |
| 3,419,386 | 12/1968 | Holland | 75/200 X |
| 3,453,105 | 7/1969 | Flaks et al. | 75/213 |
| 3,723,838 | 3/1973 | Kumagai | 317/258 |
| 3,843,360 | 10/1974 | Hanaoka | 75/222 |
| 3,847,658 | 11/1974 | Kumagai | 317/258 X |
| 3,867,129 | 2/1975 | Ronneau et al. | 75/174 |

Primary Examiner—Richard E. Schafer
Attorney, Agent, or Firm—Kemon, Palmer & Estabrook

[57] ABSTRACT

Improved sintered anodes for solid electrolytic capacitors are produced from a mixture of at least two powders the first being of pure film forming metal and the second of a film forming metal with addition of at least one of the elements : nitrogen, tungsten, molybdenum, vanadium and hafnium. The relative concentration of the added element is between 100 and 20,000 ppm. by weight.

7 Claims, 4 Drawing Figures

ANODES FOR SOLID ELECTROLYTE CAPACITORS

BACKGROUND OF THE INVENTION

The present invention concerns improvements in the manufacture of anodes for capacitors and specially for solid-electrolyte capacitors of the type described in U.S. Pat. No. 3,093,883 filed on Apr. 2, 1953, by Haring and Taylor and assigned to Bell Laboratories. The commercial success of capacitors of this type is the best proof of the advantages which they can bring to users. The requirements of the users have increased as technological advances were made by the manufacturers of capacitors. The present invention has essentially for its object to provide improvements with the object of bettering the secondary characteristics of capacitors of the above type and more particularly to reduce derating (i.e. variation of the capacitance as a function of temperature) specially in the case of sub. zero temperatures, and to reduce the dissipation factor. By way of example, medium-voltage (40–50 V) type capacitors, as sold by the Assignee under type number PA 85, show a relative variation of the capacitance value between 25° C and − 55° C of only about 30 % of the typical value for identical capacitors which do not incorporate the improvements of the invention. With the same series of capacitors, a reduction of the dissipation factor of up to 40 % of the typical value is provided by means of the invention.

In accordance with the essential feature of the invention, the sintered anode consists of a film forming containing between 100 and 20,000 ppm. of at least one of the following elements: nitrogen, tungsten, molybdenum, vanadium and hafnium. In accordance with a preferred variant of the invention, the anode is manufactured from a mixture of powders, the first of which is pure, film forming metal, while at least one of the others comprises at least one of the elements nitrogen, tantalum, niobium, tungsten, molybdenum, vanadium and hafnium. Preferably, the grain sizes of the powders consist essentially of the same metal as the first powder and at least one of the above-mentioned elements. In accordance with the characteristics of the capacitor to be obtained and the available powders, the relative proportions of the powders in the mixture may cover a very wide range. The mixture may be employed either directly or after a pre-granulation stage as described in U.S. Pat. No. 3,453,105 filed on Oct. 9, 1967, by one of the inventors and S. Flaks and assigned to the same assignee.

PRIOR ART

Hitherto, it has been believed that the quality of solid-electrolyte capacitors produced as described in the aforesaid Western Electric patent required the use of a film forming metal which was as pure as possible, and many methods of purification have been described notably in regard to tantalum. The Applicants have found that the performances of capacitors comprising anodes containing, in addition to the film forming metal, at least one of the elements nitrogen, tungsten, molybdenum, vanadium and hafnium, were improved as compared with the performances of capacitors of the same geometrical form comprising an andode produced from pure film forming metal. No explanation for this phenomenon has yet been found. However, it has been pointed out, for instance in U.S. Pat. No. 3,285,716, applied for on July 20, 1964, by C. CONTANT, that in the case of rolled liquid-electrolyte capacitors produced from etched tantalum foil, the variation of the value of the capacitance as a function of temperature can be reduced by using, not a pure tantalum foil, but a tantalum foil containing a few parts per million of molybdenum. Likewise, it is stated in U.S. Pat. No. 3,320,500, filed on Dec. 27, 1965, N. N. Axelrod & Al and assigned to Western Electric, that some of the parameters of non-electrolytic thin-film capacitors consisting of a tantalum electrode and a tantalum oxide dielectric are improved if the tantalum is replaced by an alloy of tantalum and a very large number of elements including the aforesaid elements. The improvement concerns essentially the symetry of the capacitor, which can become almost perfect. In accordance with the last said patent, the alloy is obtained by through simultaneous vacuum evaporation of the two metals.

DETAILED DESCRIPTION OF THE INVENTION

Figure 1A:
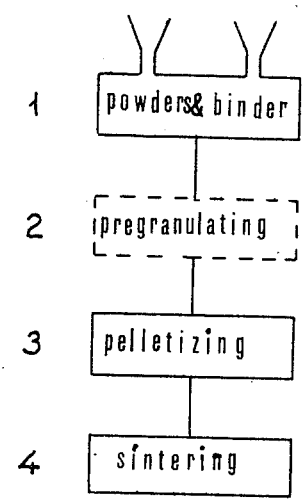
Figure 1B:
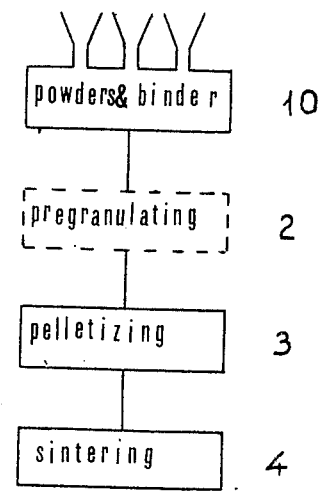
Figure 2:
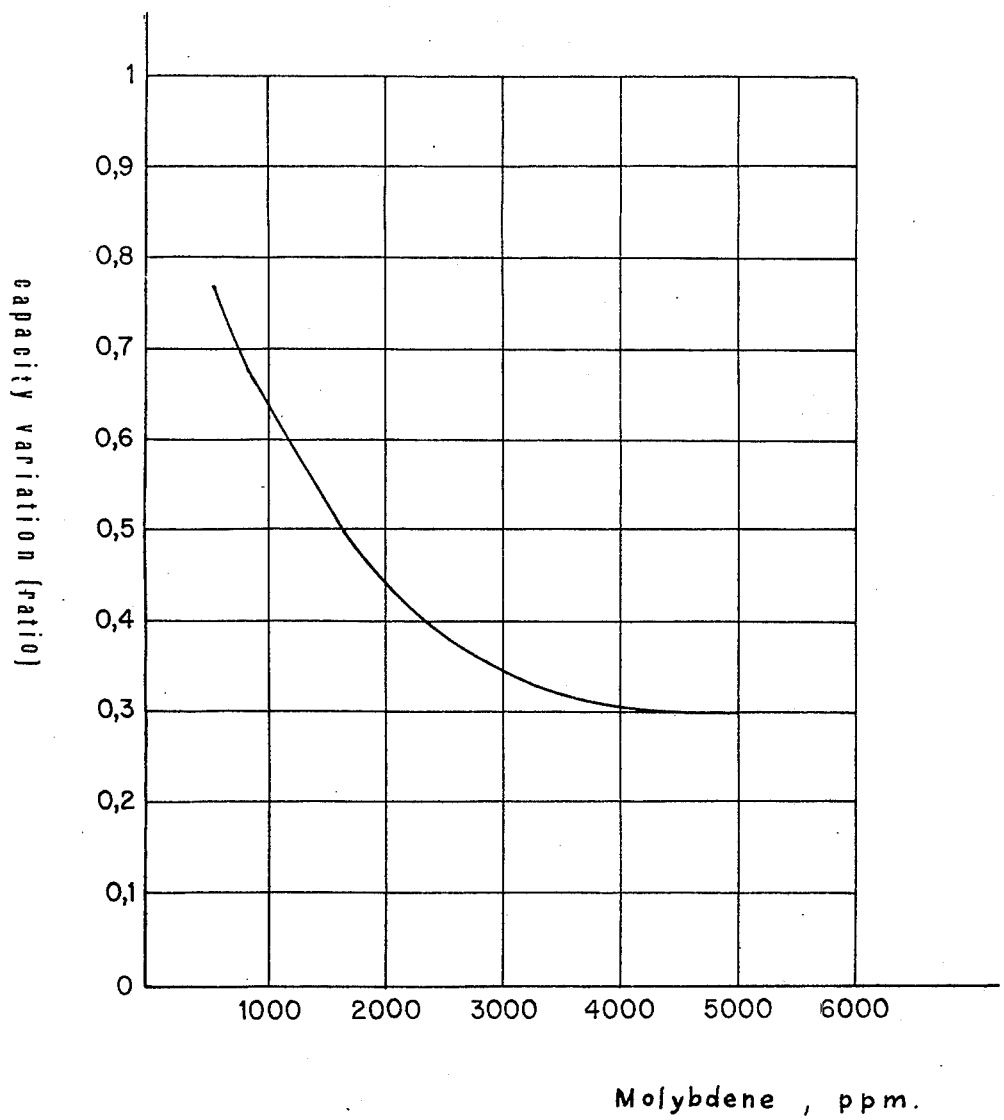
Figure 3:
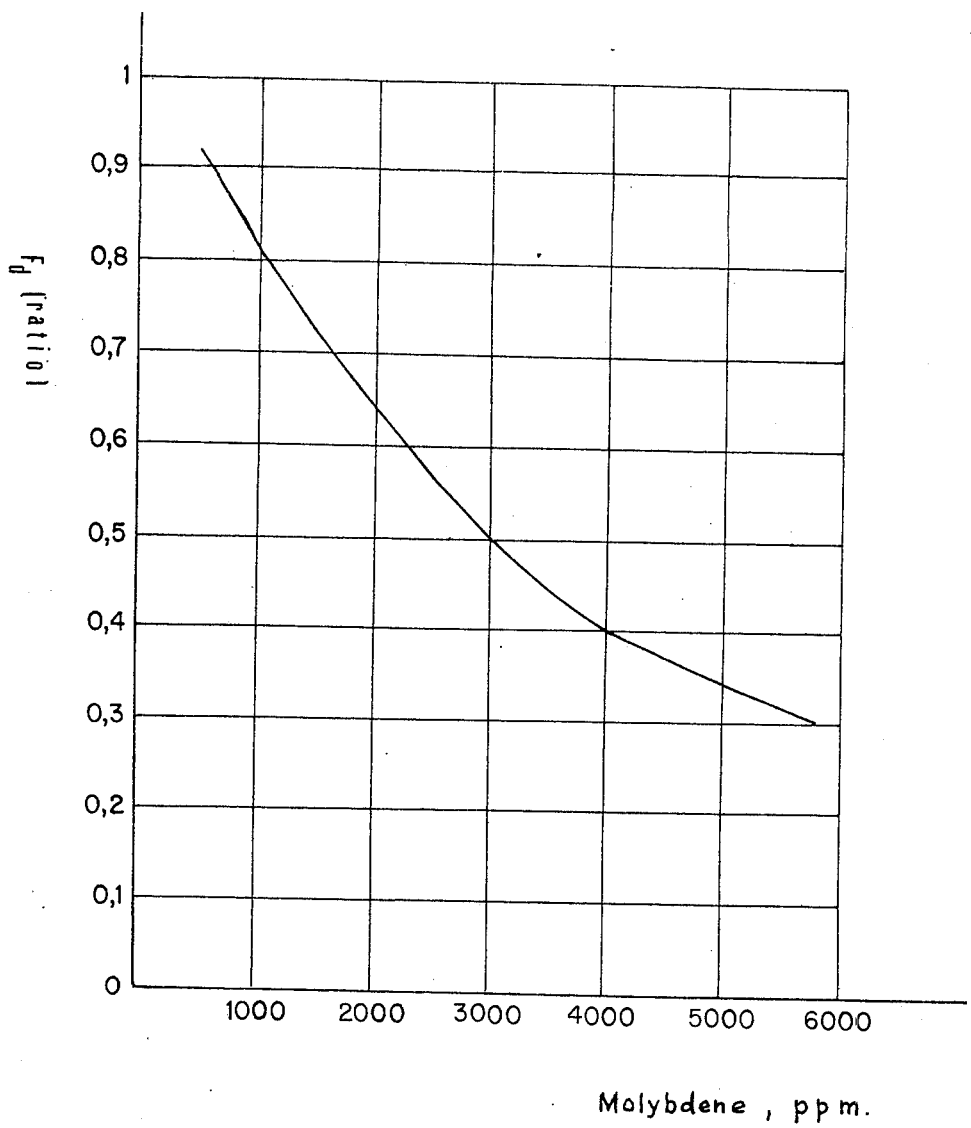

The invention will be more readily understood from the following description and from the accompanying figures, which are given as a non-limiting example of the performance of capacitors incorporating anode according to the invention, and in which:

FIGS. 1A and 1B is a block diagram of the manufacture of the anodes according to the invention, and FIGS. 2 and 3 illustrate the improved characteristics in capacitors made of an anode manufactured in accordance with one variant of the invention, as compared with the same characteristics of capacitors in which pure tantalum anodes are employed.

It is well known that the chemical and physical properties of the powders used for manufacturing sintered anodes of solid-electrolyte capacitors are set by the manufacturer, account being taken of the characteristics of the completed capacitor to be obtained. In the following, the results relate to capacitors having a tantalum anode, but it is to be understood that tantalum may be replaced by any other film forming metal without departing from the scope of the invention.

FIG. 1A shows the various steps of the manufacture of a sintered tantalum anode according to the prior art, and FIG. 1B that of an anode according to the present invention.

In accordance with the prior art, the tantalum powder taken from a store and optionally an added binder are mechanically mixed in the first operating step denoted by 1 in FIG. 1A. The most commonly employed binder is stearic acid in a relative concentration between 4 % and 6 % of the weight of the tantalum powder. The addition of binder facilitates the pelletising in some cases, as is well known to the person skilled in the art. The second operating step consists in the pre-granulation operation described in U.S. Pat. No. 3,453,105, which constitutes steps 4, 5 and 6 of the procedure illustrated in FIG. 1 of the said patent. This is followed by the pressing of the pellets (step number 3), in the customary way, and then by the sintering of the pellets (step number 4). Then an anode consisting of a cohesive sponge of metallic tantalum is obtained. The production of a capacitor from this anode involves a number of operations which are described in detail in the aforesaid Bell Laboratories U.S. Pat. No. 3,093,883.

FIG. 1B illustrates the various steps of the manufacture of an anode according to the present invention, steps analogous to those of the prior art (FIG. 1A)

bearing the same reference numerals. As will be apparent, step 1 of the preparation of the powder with optional addition of binder is replaced by step 10, which consists of the mixing of at least two metallic powders, one of which consists of pure tantalum, while the other is a tantalum powder containing the chosen proportion of one of the elements referred to in the foregoing, namely nitrogen, tungsten, molybdenum, vanadium and hafnium, or of a mixture of these metals. The N.V. REFRAMET-HOBOKEN S.A. —Adolf Greinerstraat 14 — B–2710 HOBOKEN Belgium — has been assigned a patent application filed in Luxembourg on Feb. 12, 1973, now Luxembourg Patent No. 67,009 which describes a type of powder suitable for the manufacture of anodes according to the present invention. If desired, a binder is added to the constituents of the mixture.

The mixing operation is carried out under the following conditons: the pure tantalum powder and the tantalum powder containing one or more of the aforesaid elements are disposed in a mixer, when necessary, the required quantity of binder is added thereto, in solution in a volatile solvent which is inert to the metals under consideration, the quantity of such solvent being so limited that the mixing can be carried out without fear of sedimentation in the mixer, but being sufficient to ensure that a fluid paste is formed. The mixing is continued until the evaporation of the solvent brings the paste thus formed to the appropriate viscosity for the pre-granulation. The following steps of the manufacture are known to the person skilled in the art.

Experiments have shown that favourable results are also obtained by introducing at least two additives into the same powder. There may also be employed a number of powders which are different in respect of the nature of the additive which they contain. The results illustrated in FIGS. 2 and 3 concern capacitors of which the anode is produced from a mixture of two powders, one of which is pure tantalum, while the other is tantalum containing molybdenum. This particular example, which is given as a non-limiting illustration, has been chosen because, of various experiments carried out, it has given particularly useful results in regard to the two characteristics of the capacitors which were to be improved, namely the stability of the value of the capacitance as a function of temperature at low temperature, and the dissipation factor. The curve of FIG. 2 (in relative values) shows the variation of the ratio $(C_1 - C_2)/C_1$, where $C_1$ and $C_2$ are respectively the capacitances at 25° C and at −55° C, as a function of the molybdenum concentration, the value 1 being allocated to capacitors comprising an anode of pure tantalum. The anodes are manufactured by mixing a pure tantalum powder and a tantalum powder containing molybdenum in equal parts by volume.

The curve of FIG. 3 represents the relative value of the dissipation factor $F_d = \tan \delta$ of the same capacitors. The measurements were made on capacitors produced from cylindrical anodes ($\phi = 4.8$ mm ; $h = 8$ mm) of 1 g, sintered at 1850° C for 30 minutes and in the following ranges:

22 $\mu$F/40 V
15 $\mu$F/50 V
33 $\mu$F/25 V.

The characteristics were measured in accordance with the conditions specified in standard CCTU 02–12B. The curves correspond to mean values.

What we claim is:

1. Anodes for solid electrolytic capacitors consisting essentially of a porous sintered body formed of a mixture of at least two different metal powders, the first of said metal powders being of pure film forming metal and the second of said metal powders being of film forming metal containing at least one element from the group consisting of nitrogen, tungsten, molybdenum, vanadium and hafnium, said element constituting about 100 to 20,000 ppm. by weight of said second metal powder.

2. Sintered anodes for solid electrolytic capacitors according to claim 1 in which the at least two powders are mechanically mixed before pre-granulating.

3. Anodes for solid electrolytic capacitors as claimed in claim 1 wherein said different metal powders comprise the same film forming metal.

4. Anodes for solid electrolytic capacitors as claimed in claim 1 wherein said film forming metal is tantalum.

5. Anodes for solid electrolytic capacitors as claimed in claim 4 wherein said element is molybdenum.

6. Anodes for solid electrolytic capacitors as claimed in claim 1 wherein the volume of the second of said metal powders is between 0.2 and 5 times the volume of said first of said metal powders.

7. Anodes for solid electrolytic capacitors as claimed in claim 1 that consist of a porous sintered body of a mixture of pure powdered tantalum metal and a second powder consisting of tantalum metal containing about 100 to 20,000 ppm. by weight of molybdenum, the volume of said second powder being between 0.2 and 5 times the volume of the pure powdered tantalum metal.

* * * * *

UNITED STATES PATENT OFFICE
CERTIFICATE OF CORRECTION

PATENT NO. : 3,984,208
DATED : October 5, 1976
INVENTOR(S) : Jean-Claude Moulin; Balint Escher; Dominique Prince It is certified that error appears in the above-identified patent and that said Letters Patent are hereby corrected as shown below:

Column 1, line 41, after "powders" insert

--are similar to one another. Preferably the second powder or powders--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*